United States Patent Office 3,040,821
Patented June 26, 1962

3,040,821
DRILLING WELLS WITH CLEAR WATER
Moses B. Widess, Tulsa, Okla., assignor to Pan American Petroleum Corporation, Tulsa, Okla., a corporation of Delaware
No Drawing. Filed Feb. 17, 1958, Ser. No. 715,495
3 Claims. (175—66)

This invention relates to well drilling operations. More particularly, it relates to drilling a well by the rotary method while circulating clear water in the well as a drilling fluid.

Drilling rates can be greatly increased in rotary drilling operations by circulating clear water rather than the mud conventionally used. One of the problems of this method, however, is lifting bit cuttings out of a well. The clear water does not have sufficient viscosity to lift the cuttings as effectively as might be desired. This is particularly true when the well has sections of enlarged diameter where the velocity of upward flow of water is reduced. The problem is particularly severe when flocculents, such as acrylamide polymer hydrolytes, are used to promote settling of inorganic solids in the mud pits. The water in such cases is more free from solids and, thus, is less viscous. The hydrolytes do not coagulate many organic colloids, such as starch. Therefore, these colloids can be used to increase the viscosity of water treated with the hydrolytes. The viscosity of the water cannot be greatly increased, however, to improve the ability of the water to carry cuttings up the well. The hydrolytes will not cause bit cuttings to settle rapidly in the mud pits when the viscosity of the water is more than about 4 centipoises. Increasing the viscosity of the water by the addition of inorganic solids, such as bentonite, to improve bit cuttings removal defeats, of course, the purpose of clear water drilling.

An object of this invention is to provide a method for removing bit cuttings from a well while drilling with water substantially free from solids. A more specific object is to provide a method for lifting bit cuttings from a well during drilling operations in which the drilling water leaving the well and entering the mud pits is treated with acrylamide polymer hydrolytes to promote rapid settling of inorganic solids. Still other objects will appear to those skilled in the art from the following description and claims.

In general, I accomplish the objects of my invention by circulating intermittently in the well viscous slugs or batches of liquids or gels. These slugs circulate down the well to the bottom, pass through the bit, and rise up the well. As they rise, they sweep along the bit cuttings which have gathered during drilling operations with clear water. The drilling rate is, of course, decreased while the viscous slug flows past the bit, but this is only for a very few minutes. The over-all drilling rate is not, therefore, greatly reduced, but the bit cuttings are effectively swept out of the well.

The slugs may vary from about 10 to about 100 barrels in volume, for example. Larger volumes should, in general, be used in deeper wells since there is more opportunity in such wells for dilution of the slug at both ends by clear water. The frequency of circulating the viscous slugs should vary with the rate of drilling. When drilling rapidly, it may be advisable to inject a slug every hour or even every half hour. When drilling slowly, a slug every day or so may be adequate.

The viscous slugs should preferably be aqueous, but may be oil thickened by the addition of aluminum soaps, for example. Aqueous slugs may be water dispersions of organic colloids, such as starch, sodium carboxymethyl cellulose, water-soluble gums, or the like. They may also be dispersions of inorganic solids, such as bentonite. If slugs of these materials are circulated in the well, arrangements should be made at the surface to divert the drilling water stream to special storage pits when the slug reaches the surface. Contamination of the main drilling water system with the viscosity-producing additives will thus be avoided.

A particularly advantageous viscous slug can be prepared by use of a high concentration of the type of acrylamide polymer hydrolytes used for promoting settling of inorganic solids in the mud pits. These are hydrolytes in which about 0.8 to 10 percent of the amide groups have been replaced by carboxyl groups. That is, the hydrolytes should contain from about 10 to about 120 times as many amide groups as carboxyl groups. The polymerization should have been carried to such a degree that a 0.5 percent by weight solution in distilled water having a pH of 3 to 3.5 and a temperature of 21.5° C. has a viscosity of at least 4 centipoises as determined with an Ostwald viscosimeter. These hydrolytes may be produced by various means and may be co-polymerized with up to about 15 percent of other monomers as described in more detail in Canadian Patent 522,850 issued to David J. Pye and Canadian Patent 522,851 issued to David J. Pye et al.

The advantage of using the acrylamide polymer hydrolytes to form viscous slugs is that the slugs can be permitted to flow into the regular mud pits with the other drilling water. If the hydrolytes in the slug disperse into the water in the pits, these hydrolytes simply aid in clarifying the water.

Rather wide variation of the viscosity of the viscous slugs can be permitted. Higher viscosities produce better cuttings removal. They also permit less mixing with clear water at the ends of the slugs and are more easily detected when the slugs return to the surface. More highly viscous gels are more difficult to circulate in the well, however. They are also usually more expensive since higher concentrations of thickeners are required. Theoretically, any viscosity above that of the clear water should be helpful. Actually, however, the viscosity of the slug should be at least about 10 centipoises if appreciable benefits are to result. Usually viscosities of above 100 centipoises will be advisable. Preferably, the viscosity should be in the range of about 100 to 500 centipoises. Slugs having higher viscosities in the range of 1,000 to 5,000 centipoises can be circulated. Generally, however, such high viscosities are not justified. When the term "viscous slug" is used hereinafter, it is intended to mean a slug having a viscosity in the range of about 10 to about 5,000 centipoises, and preferably in the range of 100 to 500 centipoises.

The concentration ranges of the various additives can be correlated with the viscosity ranges specified above. For example, high viscosity sodium carboxymethyl cellulose in concentrations of about 0.5 percent by weight in water at about 25° C. produces viscosities in the range of about 100 to 500 centipoises, depending on the average length of the molecules and the degree of carboxymethyl substitution. Concentrations of about 1.0 percent by weight will produce viscosities in the 1,000 to 2,000 centipoises range.

The preferred viscosity-increasing materials, the acrylamide polymer hydrolytes, produce a viscosity of about 40 centipoises at 25° C. when used in a concentration of about 1.0 percent. Concentrations of at least about 1.5 percent are required to produce viscosities in the 100 to 500 centipoises range. Solutions containing higher concentrations have still higher viscosities, but such high concentration solutions are difficult to prepare.

My invention will be better understood from consideration of the following example.

A well is being drilled using as a drilling fluid water substantially free from inorganic solids. That is, the water contains no more than a few tenths of a percent of inorganic solids, preferably no more than about 0.5 percent. Due to the low solids content, the viscosity of the water is low and bit cuttings are accumulating in the well. A viscous aqueous solution is prepared by mixing into water about 1.5 percent by weight of acrylamide polymer hydrolytes having about 50 amide groups for each carboxyl group and having a viscosity of about 10 centipoises for a 0.5 percent by weight solution of the hydrolyte. The viscosity of the 1.5 percent solution is about 110 centipoises. A 10-barrel batch or slug of this viscous solution is circulated in the well about every hour. These intermittently circulated slugs sweep bit cuttings from the well, preventing their excessive accumulation.

I claim:

1. In the method of drilling a well in which water containing no more than about 0.5 percent of solids is circulated in the well as a drilling fluid and in which loss of fluid to drilled formations is not a problem the improvement comprising the intermittent circulation at intervals of from about one-half hour to about a day of batches of liquid having a viscosity of at least about 10 centipoises but sufficiently nonviscous to be circulated in said well during drilling operations whereby bit cuttings are intermittently swept from the well, said batches having volumes of from about 10 to about 100 barrels.

2. The method of claim 1 in which the batch of viscous liquid is an aqueous solution of acrylamide polymer hydrolytes having from about 10 to about 120 amide groups for each carboxyl group and having a viscosity of at least about 4 centipoises for a 0.5 percent by weight aqueous solution of said hydrolytes, whereby said batches of liquid can be directed into the regular mud pits without increasing the solids content of the water and said hydrolytes cause improved settling of the bit cuttings in the pits.

3. The method of drilling a well in which loss of fluid to drilled formations is not a problem comprising circulating in said well water containing no more than about 0.5 percent of solids, adding to the water as it leaves the well and enters the mud pits sufficient acrylamide polymer hydrolytes to cause rapid settling of the inorganic solids from the water and provide clear water at the mud pump suction and intermittently circulating at intervals of from about one-half hour to about a day, batches of water containing sufficient of said acrylamide polymer hydrolytes to produce a viscosity of at least about 10 centipoises but sufficiently nonviscous to be circulated in said well during drilling operations, said hydrolyte having from about 10 to about 120 amide groups for each carboxyl group and having a viscosity of at least about 4 centipoises for a 0.5 percent by weight aqueous solution of said hydrolytes, said batches having volumes of from about 10 to about 100 barrels.

References Cited in the file of this patent

UNITED STATES PATENTS

| | | |
|---|---|---|
| 2,043,504 | Blow | June 9, 1936 |
| 2,252,669 | Cross et al. | Aug. 12, 1941 |
| 2,702,180 | Horner | Feb. 15, 1955 |
| 2,775,557 | Morgan | Dec. 25, 1956 |
| 2,827,964 | Saniford | Mar. 25, 1958 |
| 2,854,407 | Mallory | Sept. 30, 1958 |

FOREIGN PATENTS

| | | |
|---|---|---|
| 522,851 | Canada | Mar. 20, 1956 |

OTHER REFERENCES

McGhee: New Oil Emulsion Speeds West Texas Drilling, article in the Oil and Gas Journal, Aug. 13, 1956, pages 110, 111 and 112.

Mallory: How Low Solid Muds can Cut Drilling Costs, article in the Petroleum Engineer, April, 1957, pages B-21, B-22, B-23, and B-24.